United States Patent [19]
Heuer

[11] Patent Number: 5,154,268
[45] Date of Patent: Oct. 13, 1992

[54] CONTROL SYSTEM FOR THE CLUTCH OF A TRANSMISSION IN A MOTOR VEHICLE

[75] Inventor: Fritz Heuer, Petershausen, Fed. Rep. of Germany

[73] Assignee: MAN Nutzfahrzeuge AG, Munich, Fed. Rep. of Germany

[21] Appl. No.: 633,216

[22] Filed: Dec. 21, 1990

[30] Foreign Application Priority Data

Feb. 6, 1990 [DE] Fed. Rep. of Germany ....... 4003866

[51] Int. Cl.$^5$ .................. B60K 41/28; B60K 41/22
[52] U.S. Cl. ................ 192/0.032; 192/0.052; 192/0.076; 192/0.092; 192/3.51; 364/424.1
[58] Field of Search ........... 192/0.032, 0.076, 0.096, 192/0.052, 0.092, 4 A, 3.51; 364/424.1

[56] References Cited

U.S. PATENT DOCUMENTS

| | | | |
|---|---|---|---|
| 4,766,544 | 8/1988 | Kurihara et al. | 364/424.1 |
| 4,790,418 | 12/1988 | Brown et al. | 192/0.032 |
| 4,796,718 | 1/1989 | Thielen et al. | 192/0.052 |
| 4,803,628 | 2/1989 | Hayashi et al. | 364/424.1 |
| 4,846,321 | 7/1989 | Ohkumo | 192/0.032 |
| 4,905,801 | 3/1990 | Tezuka | 192/0.032 |
| 5,092,435 | 3/1992 | Sone et al. | 192/4 A |

Primary Examiner—Rodney H. Bonck
Assistant Examiner—Andrea Pitts
Attorney, Agent, or Firm—Ladas & Parry

[57] ABSTRACT

An IC engine is connected via a clutch with a change-speed transmission. A sensor responding to a gear selection informs the electronic control circuitry in which gear the vehicle is traveling. The rotary part of a tachometer is provided at the output of the transmission and is in cooperation with the sensor part of the tachometer, which feeds a signal to the electronic control circuitry. A universal joint shaft runs from the output of the transmission to the axle transmission, which is connected via the axles to the drive wheels. The rotary tachometer elements, connected with the drive wheels, are in cooperation with the tachometer sensors, whose output signals are supplied to the electronic control circuitry and compared therein with a calibration value. Such comparison determines the optimum clutch engagement time for the respective travel and loading condition of the vehicle. The rotary tachometer elements are in cooperation with the sensor parts of the tachometers and by making a comparison with the signals of the sensors the electronic control circuitry is able to ascertain the condition of the road surface as for instance dry or icy. The output of the engine is provided with a tachometer sensor for cooperation with a tachometer rotary element and at the transmission input there is a tachometer sensor so that the quotient of the output values thereof in cooperation with the torison of the drive train determines the clutch engagement time when driving over obstacles.

5 Claims, 1 Drawing Sheet

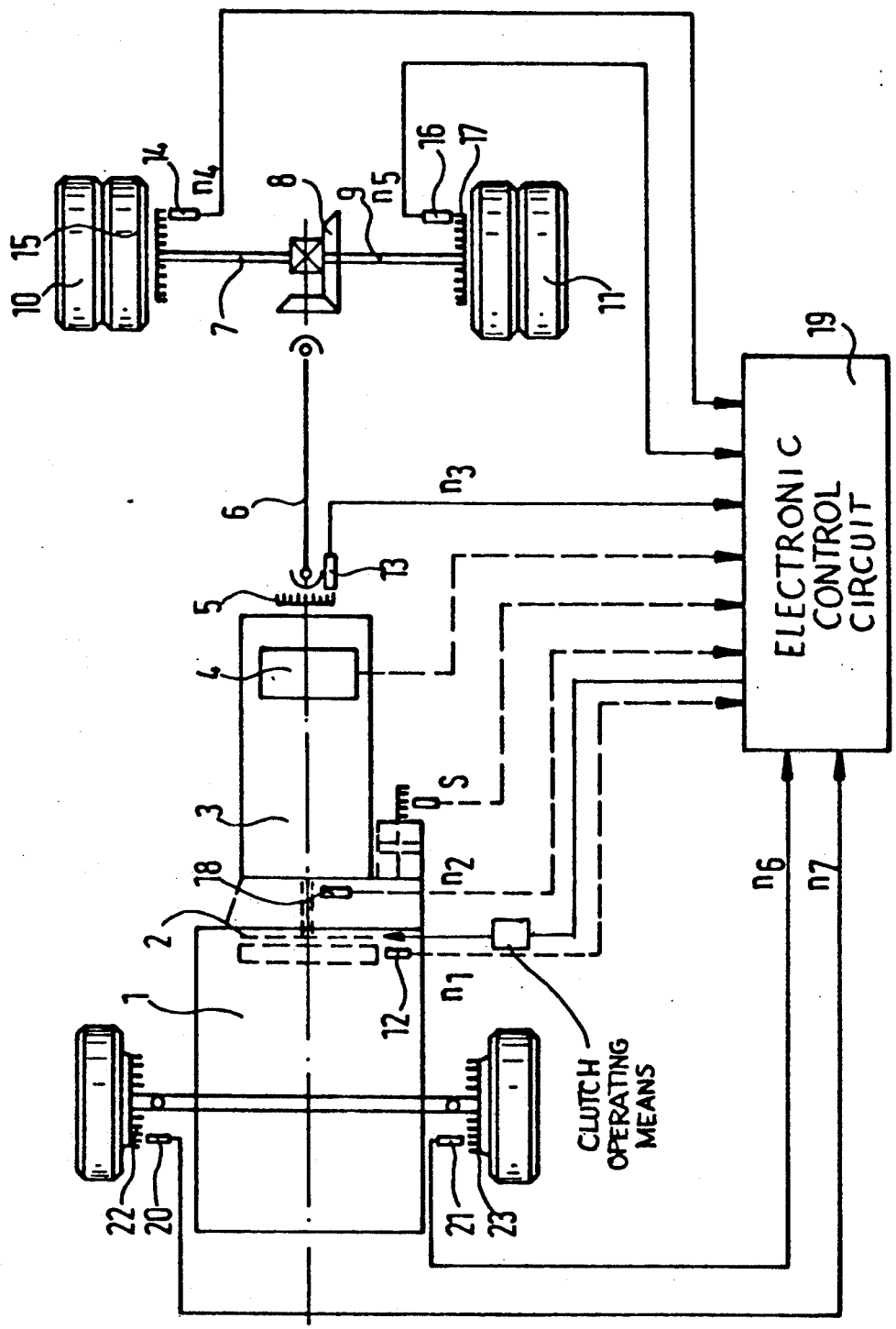

CONTROL SYSTEM FOR THE CLUTCH OF A TRANSMISSION IN A MOTOR VEHICLE

BACKGROUND OF THE INVENTION

The invention relates to a control system for a clutch of the transmission, which may be a gear box or hydrostatic transmission, in a motor vehicle and more particularly in a commercial vehicle, comprising wheel tachometer sensors, a tachometer sensor at the output of the transmission and the associated tachometer magnetic elements and the electronic control system, possibly in connection with a conventional anti-wheel lock or anti-skid system.

Conventional control systems are adapted to operate in conjunction with the speed of rotation of the engine, with the input and output speeds of the transmission, and the displacement of the mechanism for the operation of the clutch and the gear selection. Furthermore the electronic system stores the rear axle transmission ratio and the tire size in its program. This is generally sufficient in the case of private cars with small variations in the overall weight for the determination of the clutch operation time.

However, the picture is different in the case of commercial vehicles such as buses with great variations in weight between the vehicle in the fully loaded and unloaded conditions. Furthermore a vehicle may be adapted for use on roads and cross country and this involves different wheelbases and lengths of the drive train, axle transmission ratios and tire sizes. In the case of large differences in torque the driver is often no longer able to operate the clutch smoothly while still ensuring a short slip time. The shorter the slip times, particularly on hills, the shorter the interruption in the tractive effort and therefore the loss of speed during changing gear. However, in the case of empty vehicles traveling on a flat road the time taken to engage the clutch should not be too short for reasons of comfort, since owing to a reduced mass of the vehicle, changing gear then causes jerks which are unpleasant.

In order to solve such problems it would prima facie be possible to arrange load sensors on all axles or, respectively, all wheels and to evaluate the readings from the sensors in combination with the readings from a sensor responding to the road inclination. However, a more detailed consideration will show that this system would be very complex and therefore high in price. In order to measure the state of loading of the entire vehicle, each axle would have to be fitted with a sensor, that is to say including the axles of any trailer. This would however mean that the electronic control system would still not be informed whether the vehicle was to be accelerated or braked or is only to coast along. Furthermore it is not possible to detect whether the road is in a smooth or rough, condition.

SUMMARY OF THE PRESENT INVENTION

Accordingly one object of the present invention is to provide a simple system for responding to road conditions and to the state of loading of the vehicle in order to determine an optimum operation time for the clutch.

This is to be made possible in accordance with the invention since the sole characteristic for the variables determining the desired operation of the clutch, that is to say the time parameter, i.e.: the state of loading and the inclination of the road—the torque-dependent torsion angle of the drive train expressed by the ratio between the speed at the output of the transmission and the speed at the drive wheels, is used as a control input quantity fed to the electronic control system and on the basis of a comparison with a calibration value ascertained on a test bed having for instance retractable rollers, the optimum clutch operation time is set.

It is in this manner that in conjunction with the clutch operating signal provided by the driver the control electronics make it possible to establish an optimum clutch operation time in a way dependent on the incline of the road and the state of loading of the vehicle. For the driver, more particularly if he is fatigued after being at the wheel for a long time, this represents a considerable relief since he is better able to concentrate on dynamic traffic conditions. Thus it is particularly important, when the vehicle is fully loaded or when traveling uphill to keep the slip time short in order to minimize the interruption in the tractive effect and the loss in speed. In this respect it is not important to differentiate between acceleration, the fully loaded condition of the vehicle and uphill travel, for the clutch engagement time has in each case to be equal and has to be short in view of the high torque applied (short interruption in the tractive effort). This is also true for slowing down and, respectively, traveling downhill.

In accordance with a further important feature of the invention the clutch operation time is determined at a torsion angle between zero and a minimum torsion value, which is determined from the variables, as a constant value supplied to the controller and which is significantly below the calibration value. If there is only a low torque or no torque at all, or, respectively, a low torsion angle or no such angle in the drive train, then the electronic clutch circuitry will recognize that there is either a low load on the vehicle or that it is traveling on a level road. In this case the clutch operation time must be increased in order to avoid jerky clutch operation for reasons of comfort.

As part of a further advantageous form of the invention, when the vehicle drives over a curb or the like, as will be indicated by a high torsion angle of the drive train and simultaneously in the case of a high speed of rotation differential of $n_{\frac{1}{2}}$, a short clutch operation time is set by the electronic control circuitry in order to drive over an obstruction without an excessive slip time (which would lead to an increase in the clutch temperature and thus wear).

The control system in accordance with the invention is also applicable for four-wheel drive vehicles and generally for vehicles with more than one driven axle, in which case the electronic control system recognizes and processes a mean value for the twist angle, resulting from a trimming of all axles. It is in this manner that a vehicle with more than one driven axle may be efficiently and comfortably driven with different wheel friction rates.

Further significant advantages for the environment and for safety are provided by use of the control system in accordance with the invention in a private car since with the constraint enforcing slow clutch operation the control makes it impossible to do a "rubber peel start" which presents a substantial hazard for other road users. This is a benefit for the environment since the production of noise and of noxious gases is checked.

BRIEF DESCRIPTION OF THE DRAWING

Further features and advantages of the invention will be gathered from the ensuing detailed description of one embodiment thereof referring to the single FIGURE of the drawing which is a diagrammatic sketch of the control system in accordance with the invention.

DETAILED DESCRIPTION OF A PREFERRED EMBODIMENT OF THE INVENTION

The IC engine 1 of a vehicle is connected via a clutch 2 with the transmission 3. A means 4 responding to gear selection informs the electronic control circuitry 19 in which gear the vehicle is running. The magnetic element 5 of a tachometer is coupled with the transmission output and the sensor 13 of the tachometer cooperates with it to provide an output signal fed to the electronic control circuitry 19. A universal joint shaft 6 runs from the transmission output to the axle driving transmission 8, which via the axles 7 and 9 is connected with the drive wheels 10 and 11. The magnetic elements 15 and 17 of further tachometers with sensors 14 and 16 are connected with the wheels 10 and 11 and the signals produced thereby are fed to the electronic control circuitry 19 in which they are compared with a calibration value. The result of the comparison represents the optimum clutch operation time which is applicable for the instantaneous condition of vehicle loading and vehicle travel. The magnetic elements 22 and 23 are in cooperation with the tachometer sensors 20 and 21 and by a comparison with the signals from the sensors 14 and 16 the electronic circuitry is able to ascertain the condition of the road surface, for instance dry or icy. A tachometer sensor 12 is associated with the engine output and the transmission is provided with a tachometer sensor 18, the ratio of the output signals thereof being combined with the torsion of the drive train as measured by sensors to give the clutch engagement time when driving over obstructions.

I claim:

1. A control system for a clutch of a transmission of a motor vehicle having an engine and a plurality of pairs of wheels of which at least one pair of wheels is driven by the engine via the transmission, said control system comprising electronic control circuit means, wheel speed sensor means for detecting speed of the wheels of the vehicle and producing wheel speed signals which are supplied to said electronic circuit means, transmission speed sensor means for detecting speed at an output of the transmission of the vehicle and producing a transmission speed signal which is supplied to said electronic control circuit means, said electronic control circuit means calculating a ratio of the transmission speed signal to the drive wheel speed signals of the driven wheels and comparing said ratio with a predetermined calibration signal to produce an operation signal, and means for operating the clutch of the transmission in a time interval which is a function of said operation signal.

2. A system as claimed in claim 1, comprising means for producing a signal representing torsion angle in a drive train between the engine and the driven wheels, said electronic control circuit means producing said operation signal at a relatively low torsion angle of between zero and a minimum torsion angle.

3. A system as claimed in claim 1, comprising engine speed sensor means for measuring engine speed and producing an engine speed signal which is supplied to said electronic control circuit means, the latter, upon starting of the vehicle from rest when the wheel speed signals are substantially zero and an engine speed signal is present, being operative to produce said operation signal for operating the clutch in a relatively short time interval.

4. A system as claimed in claim 3, comprising means for producing a signal representative of gear ratio in the transmission and supplying said gear ratio signal to said electronic control circuit means.

5. A system as claimed in claim 3, comprising means for measuring speed at an input of the transmission to produce a signal which is supplied to said electronic control circuit means.

* * * * *